United States Patent Office 2,750,954
Patented June 19, 1956

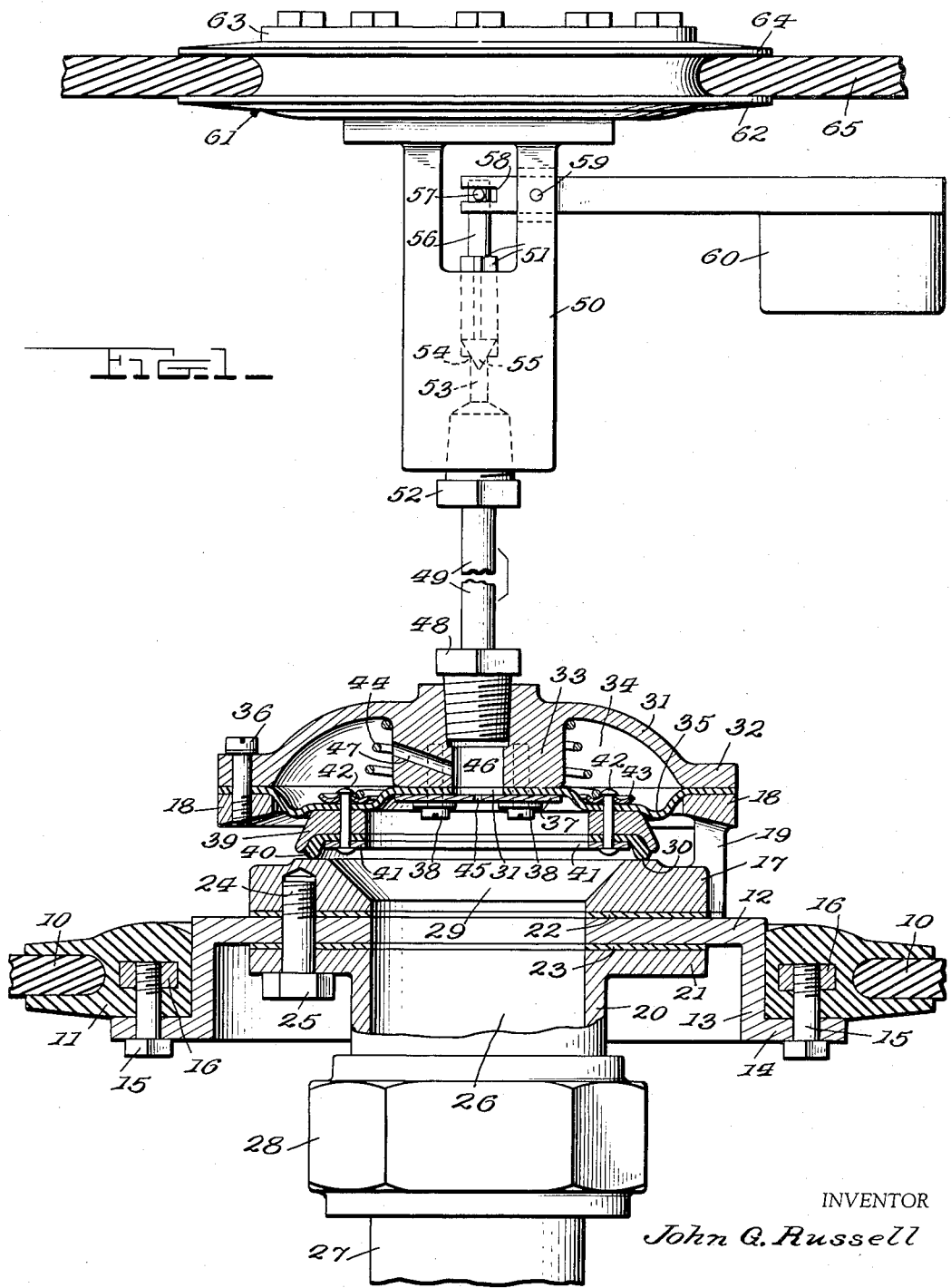

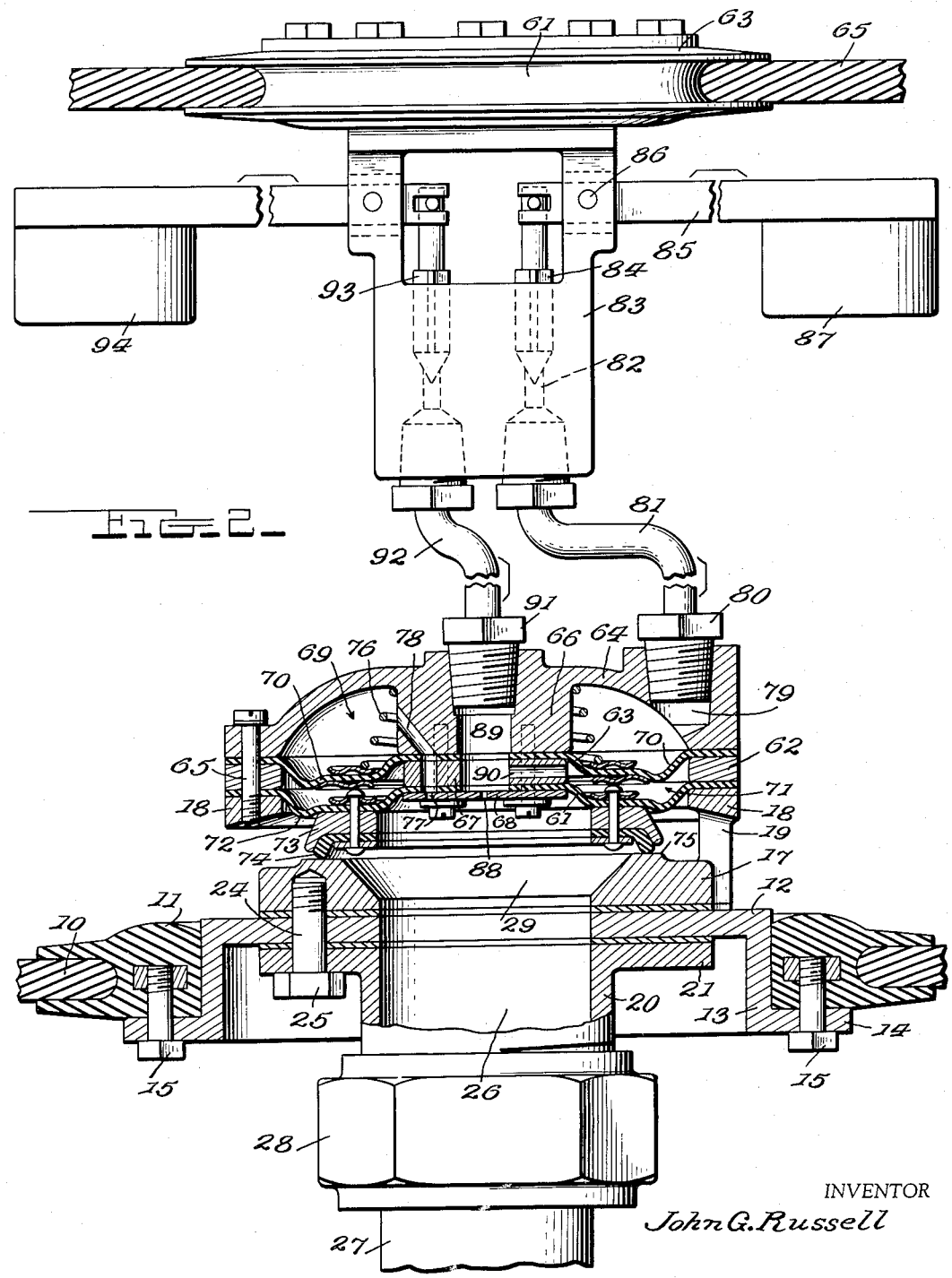

2,750,954

VALVE MECHANISM FOR FILLING AND CONTROLLING FUEL LEVEL IN A TANK

John G. Russell, Cleveland, Ohio

Application January 26, 1953, Serial No. 333,181

10 Claims. (Cl. 137—400)

This invention relates to a valve mechanism for filling a tank to a predetermined level, and more particularly to a valve mechanism wherein is included a main fluid pressure operated valve controlled by a float operated pilot valve.

The present invention is particularly adapted for use in aircraft fueling systems in connection with the filling of the tanks directly from a ground source or in connection with the transfer of fuel from one tank to another, the main valve serving to shut off incoming fluid when the fluid within the tank reaches a predetermined level. In such installations it is desirable to use a relatively large inlet opening to each tank and to supply the fluid under pressure which may be as high as 50 to 75 p. s. i. in order to fill the tanks rapidly. At the same time it is desirable that the level to which each tank is filled shall be accurately held. Since fluid enters the tank at a high rate of flow it is necessary to have the main valve close rapidly and positively when the predetermined fluid level is reached because any delay or variation in the valve closing movement will allow a relatively large amount of fluid to enter the tank and bring about undesirable variations in the level at which final shut-off is obtained.

In the conventional type of valve mechanism operating to fill tanks to a predetermined level the main valve is closed to shut off the incoming fluid by fluid pressure in a chamber disposed above the valve and having a movable wall connected to the valve. This chamber is connected to the fluid supply by a restricted opening so that fluid passes to the chamber at all times. This chamber is also connected to the tank atmosphere and this connection is controlled by a valve which is opened or closed by a float. When the fuel in the tank reaches a predetermined level the pilot valve is closed and this causes pressure to build up in the chamber to a sufficient degree so that the force on the upper side of the valve is greater than the force on the underside and the valve will close and shut off the incoming fluid.

There is necessarily a time interval of delay between the closing of the pilot valve and the building up of sufficient pressure in the chamber to close the main valve. An object of the present invention is to reduce to a minimum this time delay between the closing of the pilot valve and the closing of the main valve so that the tank may be filled to a desired selected level without fear of the tank being filled above the selected level and becoming pressurized and bursting.

A further object of the invention is to provide a valve mechanism of the above type wherein the fluid chamber for closing the main valve is relatively small and has a relatively small increase in volume when closing the main valve so that the pressure on the fluid in said chamber may be quickly raised to a degree sufficient to close the main valve.

Another object is to provide a fluid pressure operated valve of the type described in which the movable valve element is shaped and mounted so that it has a minimum of area exposed to velocity pressure of fluid in the inlet port whereby the fluid pressure force required to close the valve element may be correspondingly smaller and thus permit the area and hence the size of the valve element to also be correspondingly smaller for any given valve seat diameter.

A further object of the invention is to provide a valve mechanism of the above type wherein the valve housing has a central depending portion surrounded by an annular fluid chamber closed on the side adjacent the valve by a diaphragm, said diaphragm at its outer margin being connected to the housing and at its inner edge connected to said central depending portion of the housing, thus providing an annular flexible diaphragm portion subjected to fluid pressure in said chamber, the main valve being mounted on said flexible portion of the diaphragm which is so dimensioned that the valve may move to a closed position or to an open position.

These and other objects will in part be obvious and will in part be hereinafter more fully disclosed.

In the drawings:

Figure 1 is a vertical sectional view through the valve housing and its mounting on the bottom wall of a tank and showing the improved construction of the pressure chamber and the mounting of the valve on a flexible portion of a diaphragm forming the closing wall of said chamber; said view also showing the pilot valve and the float for controlling the same and the mounting of the pilot valve on the upper wall of the tank; and Figure 2 is a view similar to Figure 1, but showing a modification wherein there are two pressure chambers, two flexible diaphragms, either of which may operate to close the valve, and two independent float controlled pilot valves, one for each chamber.

The improved valve mechanism as shown in the drawings is attached to the bottom wall of the tank. It is to be understood that this valve mechanism may be attached to the upper wall of the tank with minor changes in the arrangement of the housing and the pilot valve controlling the same. The tank as illustrated has the walls thereof made of rubber. The bottom wall is indicated at 10. This bottom wall has an opening therethrough and an adapter 11 inserted in the opening, also made of rubber, is vulcanized to the wall of the tank. Said adapter has an opening therethrough and a supporting base plate 12 for the valve housing has a portion 13 fitting said opening. It also has a horizontally extending flange 14 secured to the adapter by bolts 15 threaded into nuts 16 imbedded in the adapter. There are a series of these bolts which firmly secure the base plate to the adapter which in turn is firmly secured to the body wall.

The valve housing includes a lower member 17 and an upper member 18 connected to the lower member by integral supporting posts 19. These posts are spaced from each other so as to provide relatively large open ports through which fluid may pass from within the housing to the tank.

On the underside of the plate 12 is a tubular member 20 having a flange 21 extending outwardly therefrom. Disposed between the plate 12 and the lower housing member 17 is a sealing gasket 22. Also disposed between the plate 12 and the flange 21 is a sealing gasket 23. Bolts 24 extend through the flanges and plate 12 and are threaded into the lower member of the housing. There are a series of these bolts and each one has a head 25 bearing against the underside of the flange and this will cause the flange, the plate 12 and the housing to be firmly clamped together and against the sealing gaskets. This tube 20 has a flow channel 26 therethrough for the incoming fluid. A pipe 27 is connected to the tube 20 and held thereon by a nut 28. This pipe 27 may lead to a ground supply of fluid or to other auxiliary tanks, but in either case the fluid is fed through the pipe under pressure. The lower portion of the housing has an opening 29 therethrough. There is a valve seat 30 on the upper side of the housing 17 which surrounds the opening 29.

Mounted on the upper portion 18 of the housing is a cap plate 31. This cap plate has a relatively narrow peripheral portion 32 and the cap is dome shaped from the inner side of said peripheral portion. Centrally of the dome shaped portion of the cap plate is a depending central portion 33. Lying within the dome shaped portion of the cap plate and surrounding this central portion is an annular chamber 34. This chamber is closed at the underside thereof by a diaphragm 35 which is clamped between the peripheral portion 32 of the cap plate and the upper section 18 of the housing. The diaphragm is thus clamped at its margin by bolts 36. There are, of course, a plurality of these bolts. The diaphragm is also clamped to the underface of the depending portion 33. There is a plate 37 which engages the diaphragm at the inner edge portions thereof and this plate is secured by the bolts 38, 38 to the underface of the depending portion 33. The diaphragm extends from the central depending portion of the cap plate to the periphery thereof and serves as a closing wall for the chamber 34.

The valve is in the form of a ring 39 and is secured rigidly to the flexible annular portion of the diaphragm which closes the chamber 34. There is a gasket 40 on the underside of the valve ring member 39. The ring 41 engages the gasket and rivets 42 secure the plate and gasket to the ring member and to the flexible portion of the diaphragm. There is a washer 43 beneath the heads at the upper ends of the rivet.

There is a spring 44 which engages the washer 43 at its lower end and the underface of the cap plate where it joins the center depending portion at its upper end. This spring is under slight compression and normally urges the valve toward closed position.

The plate 37 has a restricted opening 45 therethrough leading to a bore 46 extending centrally through the depending member 33. There is a passage 47 connecting the bore 46 with the chamber 34. Fluid under pressure flowing into the valve will pass through this restricted opening and thence through the passage 47 into the chamber 34. This opening 45 is at all times in direct connection with the supply of fluid and therefore the chamber 34 will be filled with fluid. Furthermore, the ring shaped valve 39 is positioned with its central opening in line with the inlet port 26 whereby the greater portion of the inflowing fluid will impinge against the fixed central support for the diaphragm.

Threaded into the bore in the cap plate is an adapter 48 to which a pipe 49 is connected. At the upper side of the tank is a bracket 50 in which a pilot valve 51 is mounted. The pipe 49 is connected to an adapter 52 threaded into the housing and this connects the pipe 49 to the passage 53 in the bracket 50 which is indicated in broken lines. There is a valve seat 54 at the upper end of the passage 53. The pilot valve has a tapered end 55 which engages this valve seat 54 for closing the passage 53. When this valve is moved away from the seat then the passage is connected to the tank atmosphere. It is noted that the body portion of the pilot valve has spaced wings 51 and the connection to the atmosphere is between these wings.

At the upper end of the stem 56 connected to the pilot valve is a pin 57 which engages the forked lever end 58 of a lever which is pivoted to the bracket at 59. On the outer end of the lever is a float 60.

This bracket is shown more or less diagrammatically as it is of ordinary structure and in detail forms no part of the present invention. The bracket has a supporting base 61 having an outwardly extending flange 62. There is a plate 63 which is clamped to this supporting base and this plate has an outwardly extending flange 64.

The upper wall 65 of the tank extends between the flanges and is clamped therebetween.

In the operation of a valve of this type fluid under pressure entering through the port 29 acts on the underside of the main valve 39, and a portion of the diaphragm 35 on an annular area whose outer margin is determined by the diameter of contact between the valve gasket 40 and seat 17 and whose inner margin is a circle lying about one-half way between the diameter of the depending portion 33 and the diameter of the opening in washer 43. The fluid pressure on the valve opens the valve against the action of the spring 44. Some of the incoming fluid passes through the orifice 45 and the passage 47 into the pressure chamber 34. There is a continuous bleed of fluid from the orifice 45 through the pipe 49 and the pilot valve 51 as long as the float 60 maintains the pilot valve in open position. The passage through the pipe 49 and pilot valve 51 is larger than the orifice 45 so that the fluid may pass through the tube and pilot valve faster than it enters through the orifice 45 thus preventing building up of fluid pressure in the chamber 34.

When the pilot valve 51 closes the pressure will build up in the chamber 34 and act on the upper side of the diaphragm to close the main valve 39 against the pressure of the incoming fluid. The time which it takes for the main valve 39 to close depends upon the volume by which the chamber 34 is increased when the valve moves to closed position, the size of the orifice 45, the pressure of the incoming fluid and to some extent the characteristics of the spring 44. Modern airplanes are refueled with equipment which develops pressure as high as from 50 to 75 p. s. i. in the supply line leading to the tank. The port or opening 29 may range from one and one-half inches to two inches in diameter depending upon the particular airplane. At this pressure with these size openings it can be readily seen that a large amount of fluid is delivered into the tank in a very small interval of time. In the construction above described where the pressure chamber is annular in shape and the portion of the diaphragm extending across and closing the pressure chamber is likewise relatively small the increase of volume in the chamber to permit the closing of the valve is also relatively small and the incoming fluid will be shut off quickly so that the tank will not become pressurized and burst.

With all other factors the same the fixed center valve described above will shut off faster than a conventional type because it requires a smaller volume of fluid to enter the pressure chamber after the pilot valve closes and before the main valve closes.

If the effective area of the diaphragm is made smaller the closing time will be increased because a higher unit pressure must be applied to the upper side of the diaphragm in order to close the valve against the incoming stream of fluid. Building up to a higher unit pressure involves a time factor. It thus follows that since making the diaphragm smaller lengthens the time for shutting off, the converse is true that lengthening the time can be accomplished by making the diaphragm area smaller. Since the fixed center gives a faster shut off time, with all other factors equal it is possible to decrease the effective diaphragm size by permitting the shut off time to lengthen out until it is equal to the shut off time for the conventional valve.

Another advantage of applicant's fixed center type valve is that the length of the pilot lines may be made longer than with conventional type of pilot control pressure operated valve. As the pilot line is increased in length the pressure drop through the line increases. If the line becomes too long the pressure drop therein would be too great as the pressure drop is reflected in a back pressure upon the upper side of the diaphragm and it may reach a point where there will be enough pressure exerted thereby on the diaphragm to prevent the main valve from opening even though the pilot valve is open. One of the factors which determines the pressure which will build up in the pilot line is the relationship between the diameter of the orifice 45 and the diameter of the pilot line that is the pipe 49 and passage 53. The smaller the diameter of the orifice 45 with respect to the pilot line the smaller will be the back pressure built up in the pilot system and hence in the pressure chamber 34. The time of shut-off of the main valve is a function of the orifice 45 since the smaller the orifice the longer will it take for the required volume of fluid to enter the pressure chamber 34 after the pilot valve 54 has been closed, and hence the longer will be the time required to shut off the main valve. With the center support and annular diaphragm a time advantage is obtained by reducing the volume of fluid required to enter the chamber 34 after the pilot valve 51 closes. This gain in time may be sacrificed in favor of a smaller orifice 45. In other words if we keep the shut-off time the same as in the conventional valve the orifice 45 can be made smaller than in the conventional valve. The making of the orifice 45 smaller permits the making of the pilot line longer; that is, the pilot line may be made longer before the back pressure therein will reach or exceed the critical pressure at which the main valve will fail to open. Also, because the movable part of the main valve is annular it has less area exposed to velocity pressure in the port 26 and there will be correspondingly less force required on the upper side of the diaphragm 35 to close the valve against incoming fluid. This force is equal to the fluid pressure times the effective area of the upper side of the diaphragm. Since the pressure does not change the area hence the diameter of the diaphragm may be reduced. This in turn allows the entire valve to be made smaller and lighter, these being highly desirable objects for aircraft parts.

In Figure 2 there is shown a modified embodiment of the invention. In the valve as shown in this figure there are two pressure chambers which are independent of each other. Associated with each chamber is an annular flexible diaphragm on one of which is mounted the valve. The diaphragms of these chambers are so positioned relative to each other that pressure on either chamber or pressure on both chambers will result in closing the valve. There is a pilot valve associated with each chamber. Referring more in detail to Fig. 2 there is an adapter 11 attached to the wall 10 of the tank. There is an opening through the adapter and set in the opening is a plate 12 which is secured to the adapter by bolts 15. This plate 12 has an inlet opening therethrough. Clamped to the plate is a depending member 20 having an opening conforming to the inlet opening through the plate 12. Attached to this member 20 by means of nut 28 is a pipe 27 through which fluid is supplied to the tank. Also clamped to the plate 12 is the valve housing which includes a lower section 17 having a ring shaped member 18 supported by posts 19. Between the posts are ports leading to the tank. Mounted on the upper face of this ring shaped member 18 is a diaphragm 61. There is a clamping ring 62 which overlies the peripheral portion of the diaphragm 61.

Mounted on the upper side of this ring shaped portion 62 is a diaphragm 63. This diaphragm is clamped against the ring shaped member 62 and in turn against the member 18 by means of a cap plate 64. Securing bolts 65 pass through the cap plate, the ring shaped member 62 and the member 18, thus firmly clamping both diaphragms to the valve housing. The cap plate 64 is generally dome-shaped and has a central depending member 66. The diaphragm 63 is clamped against this central member by means of a plate 67. The diaphragm 61 is clamped against the plate 67 by a relatively thin plate 68. Surrounding the central portion 66 is an annular chamber 69 which is closed by an annular portion 70 of the diaphragm 63. This diaphragm 63 not only closes the lower side of the pressure chamber 69, but it closes the upper side of the pressure chamber 71 which in turn is closed on the underface thereof by an annular portion 72 of the diaphragm 61.

The valve 73 is attached to this annular portion 72 of the diaphragm 61. The valve is annular and carries a gasket 74 which engages a valve seat 75 surrounding the intake opening 29. The annular portions of the two diaphragms 61 and 63 are so disposed as to normally contact with each other. There is a spring 76 located in the pressure chamber 69 which bears on the diaphragm 63 bending it downwardly and into contact with the annular portion 72 of the diaphragm 62 and in turn the valve 73 is moved to closed position.

There is a restricted opening 77 through the plate 68 which connects with a passage 78 leading to the pressure chamber 69. There is an opening 79 leading from the pressure chamber 69 and threaded into this opening is an adapter 80. A pipe 81 is connected with the adapter 80 and in turn is connected to a passage 82 in the bracket 83. A pilot valve 84 engages the valve seat at the upper end of the passage 82. This valve 84 is so shaped in the shank portion thereof that when raised the passage 82 is connected to the atmosphere of the tank. This pilot valve 84 is attached to a lever 85 pivoted intermediate its ends to the bracket 83 as indicated at 86. On the outer end of the lever 85 is a float 87. This pressure chamber 69 and the pilot valve control of the pressure thereon operates in precisely the same way as described in connection with the pressure chamber 34 in Figure 1 and further description of the operation is not thought necessary.

There is a second opening 88 through the plate 68. This is a restricted opening through which the fluid may pass into the bore 89. There is a radial passage 90 leading from this bore to the chamber 71. Threaded into the bore 89 is an adapter 91 connected by a pipe 92 to the pilot valve 93 controlled by a float 94. Fluid pressure on the chamber 72 is controlled by the pilot valve 93 in the same manner that the fluid pressure on the chamber 69 is controlled by the pilot valve 84.

When both diaphragms are intact and both pilot valves are closed then fluid pressure will build up in both the chambers 69 and 71 so as to close the valve. If, for example the diaphragm 63 should be ruptured and out of commission then pressure will operate upon the diaphragm 61 and close the valve. If, for any reason, the diaphragm 61 is ruptured and out of commission then pressure building up in the chamber 69 will force the annular portion of the diaphragm 63 into engagement with the annular portion of the diaphragm 61 and this will cause the valve to be closed. The use of two diaphragms arranged so that if one becomes ruptured or otherwise rendered inactive the other will operate to close the valve forms no part of the present invention except when a central depending portion of the cap plate is employed and both diaphragms are connected thereto so that the only active portion of the diaphragms is the annular portion between the central member to which it is clamped and the periphery of the cap plate to which the margins of the diaphragms are clamped.

The advantage of the construction so that an annular portion of the diaphragm is effective for closing the valve has been fully disclosed in connection with the description of the embodiment of the valve shown in Figure 1. The operation of a valve wherein the valve is opened by fluid pressure and is closed likewise by fluid pressure on the upper side thereof which in turn is controlled by a float actuated pilot valve has likewise been fully disclosed in connection with the single diaphragm arrangement illustrated in Figure 1 and further description thereof is not thought necessary.

It is obvious that minor changes in the details of construction may be made without departing from the scope of the invention as set forth in the appended claims.

I claim:

1. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central section to said central portion of the cap so as to provide an annular flexible portion closing said chamber, an annular valve attached to the underside of said flexible portion of the diaphragm, said valve being adapted to engage and close said inlet, said housing having a restricted opening connecting said chamber to the inlet, a passageway leading from the chamber to the interior of the tank and a float-controlled pilot valve in said passageway.

2. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central portion to said depending cap portion so as to provide an annular flexible portion closing said chamber, an annular valve attached to the underside of said flexible portion of the diaphragm, said flexible portion of the diaphragm permitting the valve to move from full open position into engagement with the valve seat for closing said inlet opening, said housing having a restricted opening connecting said chamber to the inlet, a tube connecting said chamber with the tank and a float controlled pilot valve for opening and closing said tube.

3. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central portion to said depending cap portion so as to provide an annular flexible portion closing said chamber, an annular valve attached to the underside of said flexible portion of the diaphragm, said valve being adapted to engage and close said inlet, a spring disposed in said chamber and engaging the flexible portion of said diaphragm for urging the valve toward closed position, said housing having a restricted opening connecting said chamber to the inlet, a tube connecting said chamber with the tank and a float controlled pilot valve for opening and closing said tube.

4. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central portion to said depending cap portion so as to provide an annular flexible portion closing said chamber, an annular valve attached to the underside of said flexible portion of the diaphragm, said valve being adapted to engage and close said inlet, said depending cap portion having a bore therethrough, a restricted opening connecting said bore to the inlet side of the valve, a passage connecting the bore to the pressure chamber, a float controlled pilot valve connected to said bore.

5. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central portion to said depending cap portion so as to provide an annular flexible portion closing said chamber, an annular valve attached to the underside of said flexible portion of the diaphragm, said flexible portion of the diaphragm permitting the valve to move to full open position or into engagement with said valve seat for closing said inlet opening, said depending cap portion having a central bore and a passage connecting the same with said fluid pressure chamber, a plate for closing the bore at the lower end thereof, said plate having a restricted opening therethrough connecting the bore to the inlet, a tube connected to the bore and to the tank and a float controlled valve for opening and closing the passage through said tube.

6. A valve mechanism for filling and controlling the level of fluid in a tank comprising a valve housing having an inlet opening for fluid surrounded by a valve seat and ports leading to the tank, said housing having a dome shaped cap plate provided with a centrally disposed depending portion opposite the inlet to form a fluid pressure chamber, the lower face of said depending member being located in a plane containing the undersurface of the marginal portions of the cap plate, a diaphragm clamped at its outer edge to the peripheral portion of said cap plate and also clamped to the underface of said depending member and providing an annular flexible portion in said diaphragm which closes the fluid pressure chamber, an annular valve attached to the underside of the flexible portion of the diaphragm said flexible portion of the diaphragm permitting the valve to move to full open position or into engagement with said valve seat for closing the inlet opening, said depending cap portion having a central bore therethrough, said diaphragm being clamped against the depending cap portion by a plate having a restricted opening therethrough connecting the bore with the inlet side of the valve, a passage connecting said bore with the fluid pressure chamber, a pipe connected to said bore and extending upwardly therefrom and a float controlled valve for opening and closing the passage through said pipe.

7. A valve mechanism for filling and controlling the level of fluid in a tank comprising a valve housing having an inlet opening for fluid surrounded by a valve seat and ports leading to the tank, said housing having a concave cap with a depending central portion opposite the inlet opening to form a fluid pressure chamber, a diaphragm attached at its outer margin to said housing and at its central portion to the underface of said depending cap portion so as to provide an annular flexible portion closing said chamber, a second diaphragm attached at its outer margin to the housing and at its central portion to said depending cap portion, said second diaphragm having a flexible portion disposed beneath the flexible portion of the first named diaphragm and spaced therefrom to provide a second fluid pressure chamber, a valve carried by the flexible portion of said second named diaphragm and adapted to engage and close said inlet, a spring disposed within said first named fluid pressure chamber and engaging said flexible portion of the first-named diaphragm for moving the same into engagement with the flexible portion of the second named diaphragm for closing the valve, said housing having a restricted passage connecting the first named fluid pressure chamber to the inlet side of the valve and a second restricted opening independently connecting the fluid pressure chamber between the diaphragms with the inlet side of said valve, a float operated pilot valve connected with the first named fluid chamber and a second float controlled pilot valve connected with the fluid pressure chamber between the diaphragms.

8. A fluid pressure operated valve comprising a housing having an inlet and an outlet, a movable valve element in the housing for controlling the inlet, said valve element being annular in shape and having sealed connections at its inner and outer margins with the valve housing, a wall of the housing forming with the movable valve element an expansible pressure chamber disposed above the valve element, a restricted passage for connecting the inlet to the pressure chamber, a passageway leading from the chamber to the interior of the tank and a float-controlled pilot valve in said passageway.

9. A fluid pressure operated valve comprising a housing having an inlet and an outlet, a movable valve element in the housing for controlling the inlet, said valve element being annular in shape with its central opening opposite the inlet, said valve element having sealed connections at its inner and outer margins with said valve housing, a wall of the housing forming with the valve element an expansible pressure chamber disposed above the valve element, a restricted passage for connecting the inlet to the pressure chamber, a passageway leading from the chamber to the interior of the tank and a float-controlled pilot valve in said passageway.

10. A valve mechanism for use in filling and controlling the level of fluid in a tank comprising a valve housing having an inlet opening for fluid surrounded by a valve seat and ports leading to the tank, said housing having a concave cap with a depending central portion opposite the inlet opening to form a fixed annular pressure chamber, a diaphragm attached at its outer margin to said housing and at its central section to said depending cap portion so as to provide an annular flexible bottom portion for said chamber, an annular valve attached to the underside of said flexible portion of the diaphragm in engageable relation to said inlet, said depending cap portion having a passageway therethrough with restricted openings to both the chamber and the inlet opening.

References Cited in the file of this patent
UNITED STATES PATENTS

| | | |
|---|---|---|
| 2,599,498 | Suska | June 3, 1952 |
| 2,619,108 | Sweeney | Nov. 25, 1952 |